US008621888B2

(12) United States Patent
Morooka et al.

(10) Patent No.: US 8,621,888 B2
(45) Date of Patent: Jan. 7, 2014

(54) MANUFACTURING METHOD FOR A THERMAL HEAD

(75) Inventors: Toshimitsu Morooka, Chiba (JP); Keitaro Koroishi, Chiba (JP); Yoshinori Sato, Chiba (JP); Noriyoshi Shoji, Chiba (JP); Norimitsu Sanbongi, Chiba (JP)

(73) Assignee: Seiko Instruments Inc. (JP)

( * ) Notice: Subject to any disclaimer, the term of this patent is extended or adjusted under 35 U.S.C. 154(b) by 683 days.

(21) Appl. No.: 12/460,780

(22) Filed: Jul. 24, 2009

(65) Prior Publication Data

US 2010/0071414 A1 Mar. 25, 2010

(30) Foreign Application Priority Data

Jul. 25, 2008 (JP) ................................ 2008-192192

(51) Int. Cl.
*C03B 19/00* (2006.01)
*H01C 17/00* (2006.01)
*B41J 2/335* (2006.01)

(52) U.S. Cl.
USPC .............................. 65/33.5; 29/611; 347/206

(58) Field of Classification Search
USPC .................................................... 65/33.5, 36
See application file for complete search history.

(56) References Cited

U.S. PATENT DOCUMENTS 5,514,524 A * 5/1996 Ohnishi et al. ................ 430/320
2004/0217769 A1* 11/2004 DiOrio .......................... 324/754
2006/0181581 A1* 8/2006 Jung et al. ....................... 347/68
2007/0091161 A1* 4/2007 Shoji et al. .................... 347/200

FOREIGN PATENT DOCUMENTS

JP 2007083532 A * 4/2007
WO WO 2007140537 A1 * 12/2007

OTHER PUBLICATIONS

Machine Translation Japanese Patent JP2007-083532.*

* cited by examiner

*Primary Examiner* — Matthew Daniels
*Assistant Examiner* — Lisa Herring
(74) *Attorney, Agent, or Firm* — Adams & Wilks

(57) ABSTRACT

In manufacturing method for a thermal head, concave portions, including a reference concave portion, are formed on a surface of a substrate so that a length of each of the concave portions other than the reference concave portion increases as a distance from the reference concave portion in a length direction increases and so that a width of each of the concave portions other than the reference concave portion increases as a distance from the reference concave portion in a width direction increases. A mark identifying the reference concave portion is formed on the surface of the substrate. An insulating film is thermally fusion bonded to the surface of the substrate including the concave portions formed thereon. Heating resistors are formed on the insulating film using a photo mask by aligning the photo mask with the substrate in accordance with the reference concave portion to form the heating resistors so as to be opposed to the plurality of concave portions.

13 Claims, 8 Drawing Sheets

MANUFACTURING METHOD FOR A THERMAL HEAD

BACKGROUND OF THE INVENTION

1. Field of the Invention

The present invention relates to a manufacturing method for a thermal head.

2. Description of the Related Art

There have been conventionally known a thermal head which is used in a thermal printer often equipped in a compact information terminal typified by a compact hand-held terminal, and which is used to perform printing on a thermal recording medium based on printing data with the aid of selective driving of a plurality of heating elements (for example, see JP 2007-83532 A).

As to increasing efficiency of the thermal head, there is known a method of forming a heat insulating layer in a lower layer of a heating portion of a heating resistor. When the heat insulating layer is formed in the lower layer of the heating portion, among an amount of heat generated in the heating resistor, an amount of upper-transferred heat which is transferred to a wear-resistant layer formed above the heating portion becomes larger than an amount of lower-transferred heat which is transferred to an insulating substrate located under the heating portion, and thus energy efficiency required during printing can be sufficiently obtained. In the thermal head described in JP 2007-83532 A, owing to a substrate including a concave portion, a hollow portion is formed below a heating portion of a heating resistor, and the hollow portion is caused to function as a void heat insulating layer. That is, heat transfer in a thickness direction of the substrate is prevented by means of the hollow portion, and accordingly, sufficient heat storage performance is obtained. It should be noted that the substrate for forming the hollow portion is formed by employing a fusion method in which a glass substrate including a concave portion and a flat glass substrate are bonded to each other at a temperature of about 500° C. or higher.

However, glass has a property of shrinking in a heat cycle, and thus a position of the concave portion (void heat insulating layer) formed on the glass substrate varies between before and after the bonding. In addition, a heat shrinkage percentage of glass varies depending on a composition of the glass substrate or conditions (for example, temperature, heating time, and the like) of the heat cycle. For this reason, when a thin-film-like heating resistor is formed in the heating element forming step, a pattern misalignment (position misalignment) occurs between the concave portion and the heating portion of the heating element due to heat shrinkage occurring in the bonding step, leading to inconvenience that the heating portion cannot be accommodated in the concave portion of the substrate. The pattern misalignment as described above reduces a heat insulating effect of the substrate.

Further, when a large number of thermal heads are collectively manufactured on a large substrate, an effect of the pattern misalignment due to the heat shrinkage percentage becomes particularly serious in accordance with a position of the thermal head. This leads to a decrease in yield to obtain a thermal head having high energy efficiency. The effect of the heat shrinkage on the substrate may be reduced, in some cases, by using a photo mask which is manufactured by taking the heat shrinkage percentage into consideration. However, there are variations in heat shrinkage percentage, and hence it is difficult to deal with the pattern misalignment due to the heat shrinkage only by correction using a correction mask.

SUMMARY OF THE INVENTION

The present invention has been made in view of the above-mentioned problems, and therefore, it is an object of the present invention to provide a manufacturing method for a thermal head, which is capable of preventing a pattern misalignment between a void heat insulating layer and a heating portion, and improving a yield to obtain a thermal head having high energy efficiency.

In order to achieve the above-mentioned object, the present invention provides the following means.

The present invention provides a manufacturing method for a thermal head, including: a concave portion forming step of forming a plurality of concave portions on a surface of a substrate; a bonding step of thermally fusion bonding an insulating substrate to the surface of the substrate including the plurality of concave portions formed thereon in the concave portion forming step; and a heating resistor forming step of forming a plurality of heating resistors on the insulating substrate so as to be opposed to the plurality of concave portions, in which the concave portion forming step includes setting any one of the plurality of concave portions as a reference, and setting sizes of the plurality of concave portions other than the any one of the plurality of concave portions so as to become larger as a distance from the any one thereof increases.

According to the present invention, through the bonding step, the concave portions of the substrate, which are formed in the concave portion forming step, are covered with the insulating substrate, whereby a hollow portion is formed between the substrate and the insulating substrate. The hollow portion functions as a void heat insulating layer, and heat generated in the heating portions of the heating resistors is prevented from being conducted to the substrate through the insulating substrate, with the result that the thermal head having high energy efficiency can be manufactured.

Here, the substrate and the insulating substrate are bonded to each other through thermal fusion in the bonding step, and thus the substrate exposed to high temperature undergoes thermal shrinkage after the bonding. For this reason, positions of the concave portions formed on the surface of the substrate vary between before and after the bonding. For example, when any one of the concave portions formed on the substrate is set as a reference (hereinafter, the concave portion serving as the reference is referred to as a "reference concave portion"), the positions of the concave portions are more likely to vary due to an effect of the thermal shrinkage as the distance from the reference concave portion increases.

According to the present invention, the sizes of the concave portions other than the reference concave portion are made to increase along with an increase in distance from the reference concave portion. Accordingly, even when the thermal shrinkage occurs, only by, for example, aligning a photo mask for forming the heating resistors and the substrate with each other in accordance with the reference concave portion in the heating resistor forming step, it becomes possible to limit formation positions of the heating resistors formed on the photo mask in advance to ranges of the concave portions of the substrate after the thermal shrinkage. Therefore, the heating resistors can be formed so that portions serving as the heating portions of the heating resistors are opposed to the concave portions of the substrate.

In addition, the sizes of the concave portions are changed in accordance with the distance from the reference concave portion, and thus, compared with the case where sizes of all the concave portions are increased, a bonding area between the substrate and the insulating substrate is increased to assure a mechanical strength of the insulating substrate. Accordingly, a larger number of thermal heads which have high mechanical strength and reliability can be obtained. Therefore, the yield to obtain thermal heads having high energy efficiency can be improved in the collective substrate.

In the above-mentioned invention: the plurality of concave portions may each have a rectangular shape; lengths of the plurality of concave portions other than the any one of the plurality of concave portions may become larger as a distance from the any one thereof in a length direction increases; and widths of the plurality of concave portions other than the any one of the plurality of concave portions may become larger as a distance from the any one thereof in a width direction increases.

With the structure as described above, by increasing sizes of the concave portions having the rectangular shape in a direction in which the concave portions are apart from the reference concave portion, that is, in the direction in which the positions thereof vary considerably due to an effect of the thermal shrinkage, the heating portions of the heating resistors can be efficiently accommodated in the concave portions after the bonding without unnecessarily increasing the concave portions.

Still further, in the above-mentioned invention, the manufacturing method may further include a mark forming step of forming, on the substrate, a mark indicating the any one of the plurality of concave portions that serves as the reference.

With the structure as described above, in the heating resistor forming step, alignment between the photo mask and the substrate can be easily and accurately performed with reference to the mark formed on the substrate, for example, with the reference concave portion as the reference.

According to the present invention, an effect is achieved whereby the pattern misalignment between the void heat insulating layer and the heating portion is prevented, thereby improving the yield to obtain a thermal head having high energy efficiency.

DETAILED DESCRIPTION OF THE PREFERRED EMBODIMENT

Hereinafter, with reference to the drawings, a manufacturing method A for a thermal head according to an embodiment of the present invention is described.

Figure 1:
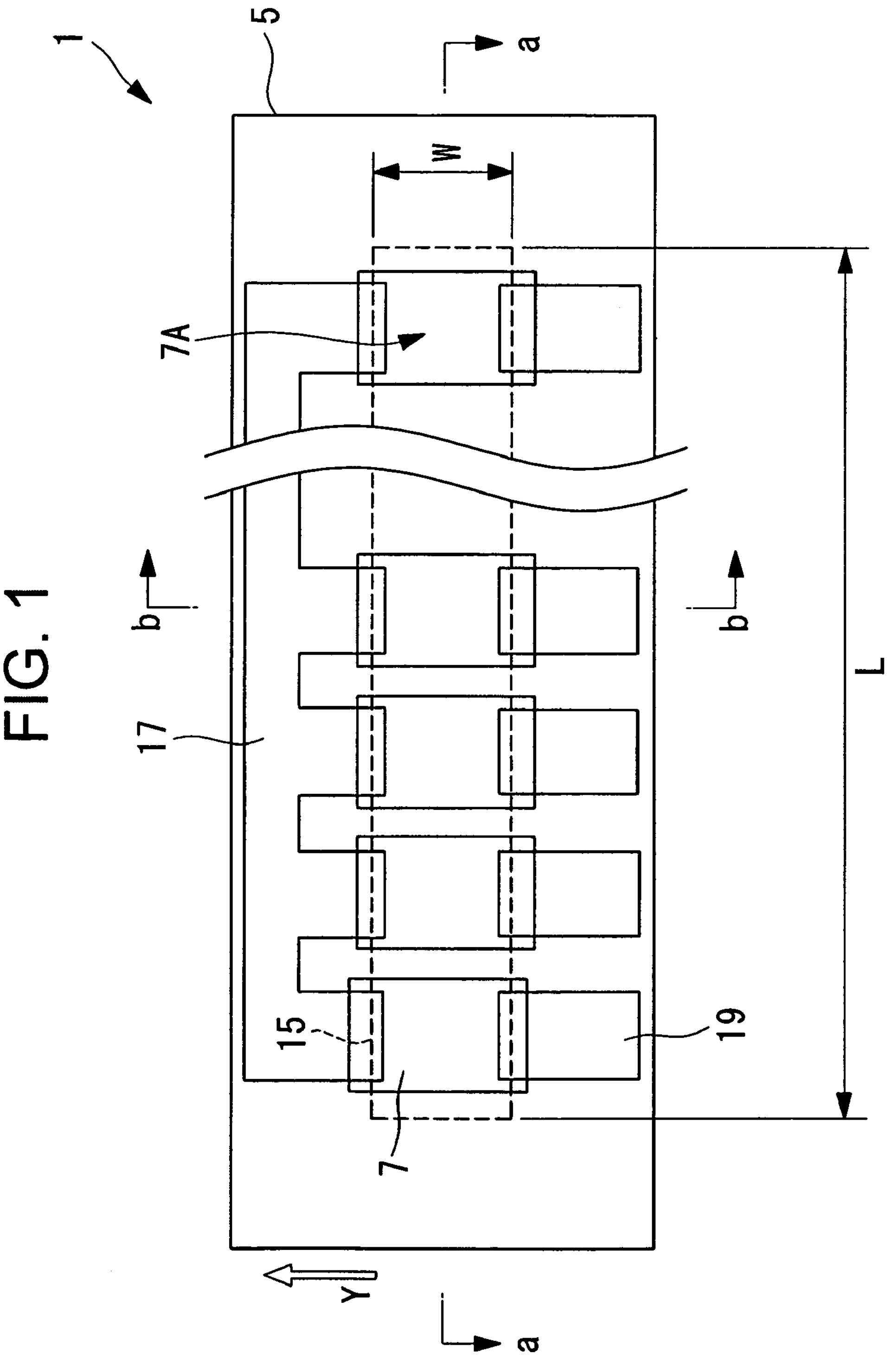
FIG. 1 is a schematic view of an upper end surface of a thermal head manufactured by a manufacturing method for a thermal head according to an embodiment of the present invention.
Figure 2:
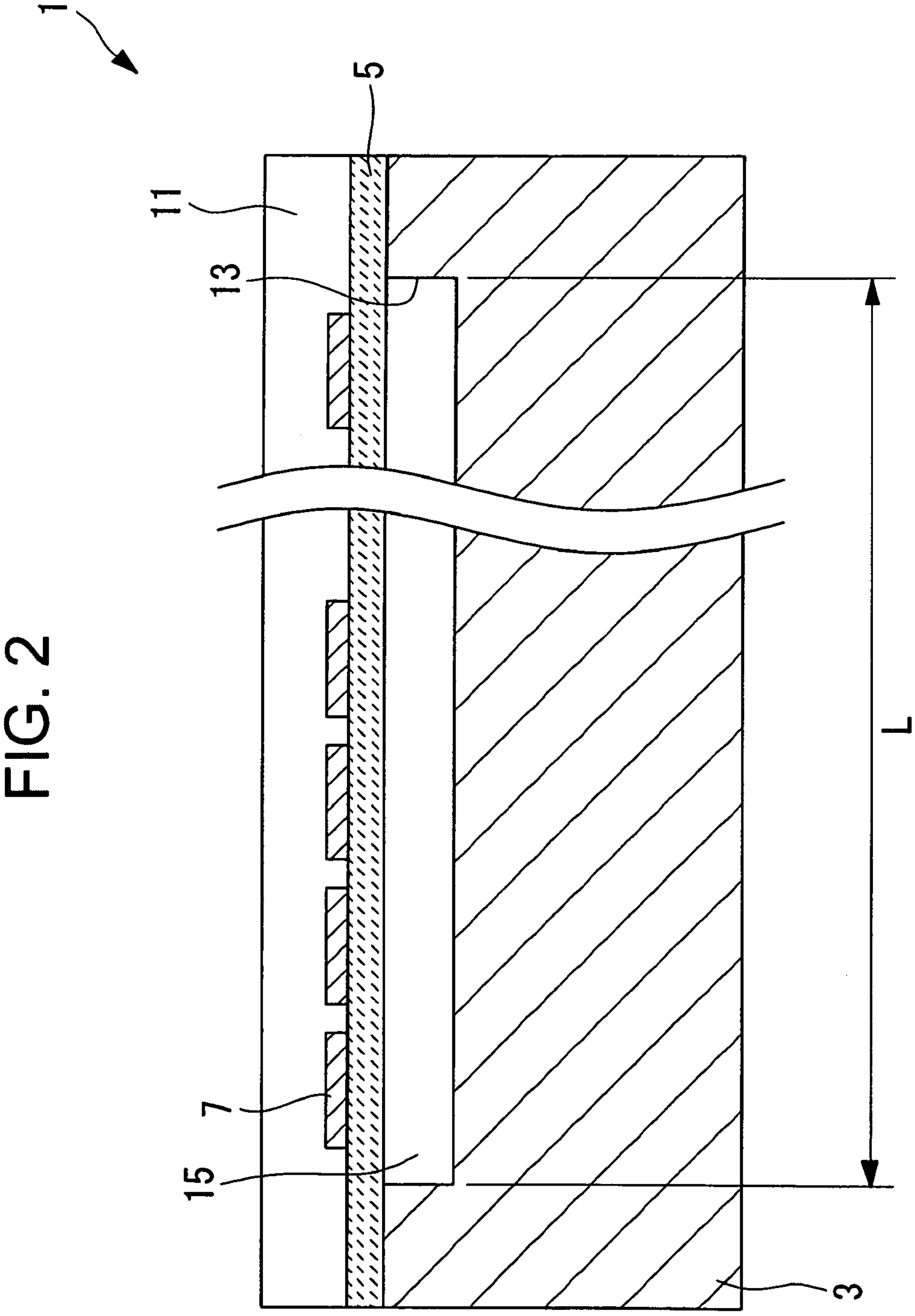
FIG. 2 is a cross-sectional view taken along the line a-a of FIG. 1.
Figure 3:
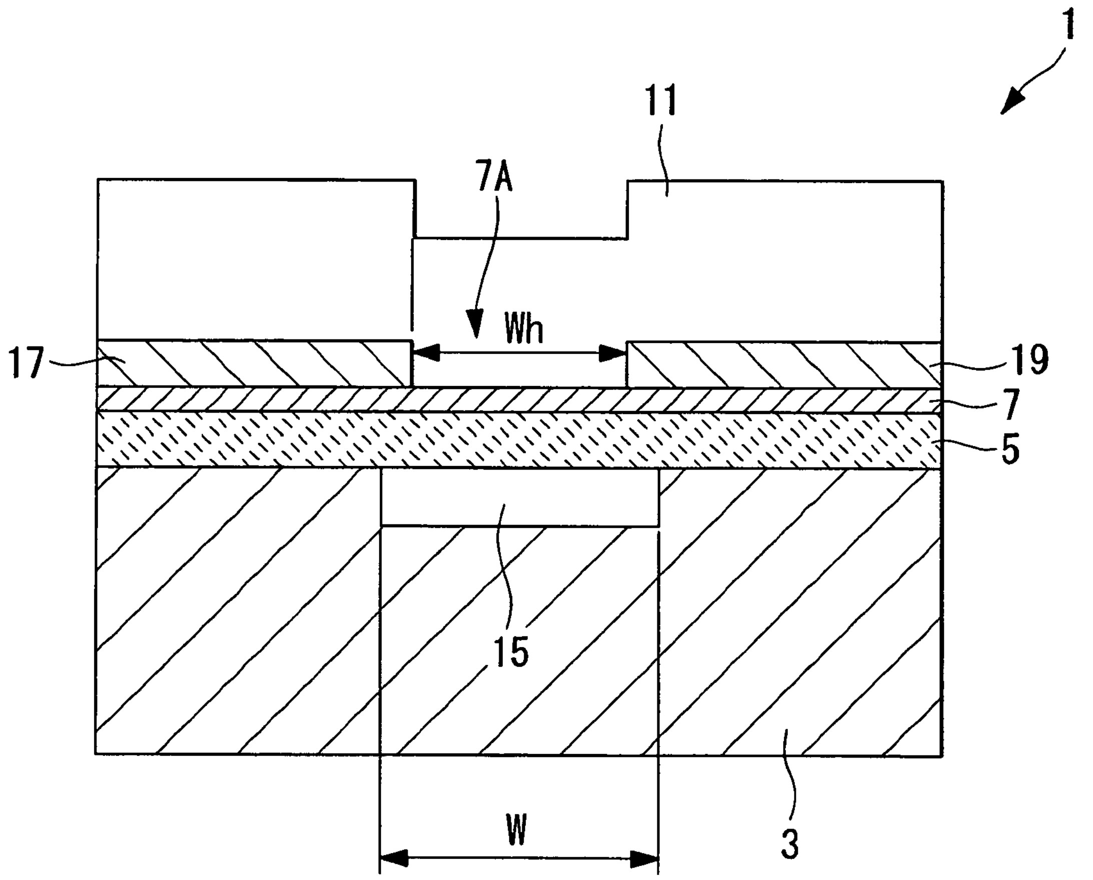
FIG. 3 is a cross-sectional view taken along the line b-b of FIG. 1.

The manufacturing method A for a thermal head according to this embodiment is a method for manufacturing, for example, a thermal head 1 used in a thermal printer or the like, as illustrated in FIG. 1 to FIG. 3.

Note that, in FIG. 1, an arrow Y represents a transport direction of an object-to-be-printed (for example, thermal recording paper).

The thermal head 1 is a plate-like member, and includes a rectangular substrate 3, an insulating film (insulating substrate) 5 which is formed on the substrate 3 and serves as an undercoat layer, a plurality of heating resistors 7 which are formed on the insulating film 5 and serve as a heating element, an electrode portion 17, 19 which is connected to the heating resistors 7 and serve as wiring, and a protective film 11 for covering top surfaces of the heating resistors 7 and the electrode portion 17, 19.

The substrate 3 is, for example, a glass substrate having a thickness of about 300 μm to 1 mm. A rectangular concave portion 13 extending in a longitudinal direction of the substrate 3 is formed on a surface (upper end surface) of the substrate 3. Note that a length in a longitudinal direction and a width in a width direction of the concave portion 13 are denoted by a length L and a width W, respectively.

As the insulating film 5, for example, flat sheet glass having a thickness of 5 μm to 100 μm is used.

Between the substrate 3 and the insulating film 5, a hollow portion (hereinafter, the hollow portion is referred to as a "void heat insulating layer") 15 is formed in a region in which the concave portion 13 is covered with the insulating film 5. The void heat insulating layer 15 functions as a heat insulating layer for preventing an influx of heat from the insulating film 5 to the substrate 3 and has a communicating structure so as to be opposed to all the heating resistors 7.

The heating resistors 7 are each provided so as to straddle the concave portion 13 in its width direction on an upper end surface of the insulating film 5, and are arranged at predetermined intervals in the longitudinal direction of the concave portion 13. In other words, each of the heating resistors 7 is provided to be opposed to the void heat insulating layer 15 with the insulating film 5 being sandwiched therebetween so as to be located substantially directly above the void heat insulating layer 15.

The electrode portion 17, 19 is formed of a common electrode 17 connected to one end of the respective heating resistors 7 in a direction orthogonal to an arrangement direction thereof and individual electrodes 19 each connected to another end of each of the heating resistors 7, respectively. The common electrode 17 is integrally connected to all the heating resistors 7. Note that a portion in which the heating resistor 7 actually generates heat (hereinafter, the heating portion is referred to as a "heating portion 7A") is a portion in which the heating resistor 7 does not overlap the electrode portion 17, 19, that is, a region located between a connection surface of the common electrode 17 and a connection surface of the individual electrode 19 of the heating resistor 7, which is a portion located substantially directly above the void heat insulating layer 15.

Hereinafter, the manufacturing method A for the thermal head thus manufactured (hereinafter, simply referred to as "manufacturing method A") is described.

Figure 4:
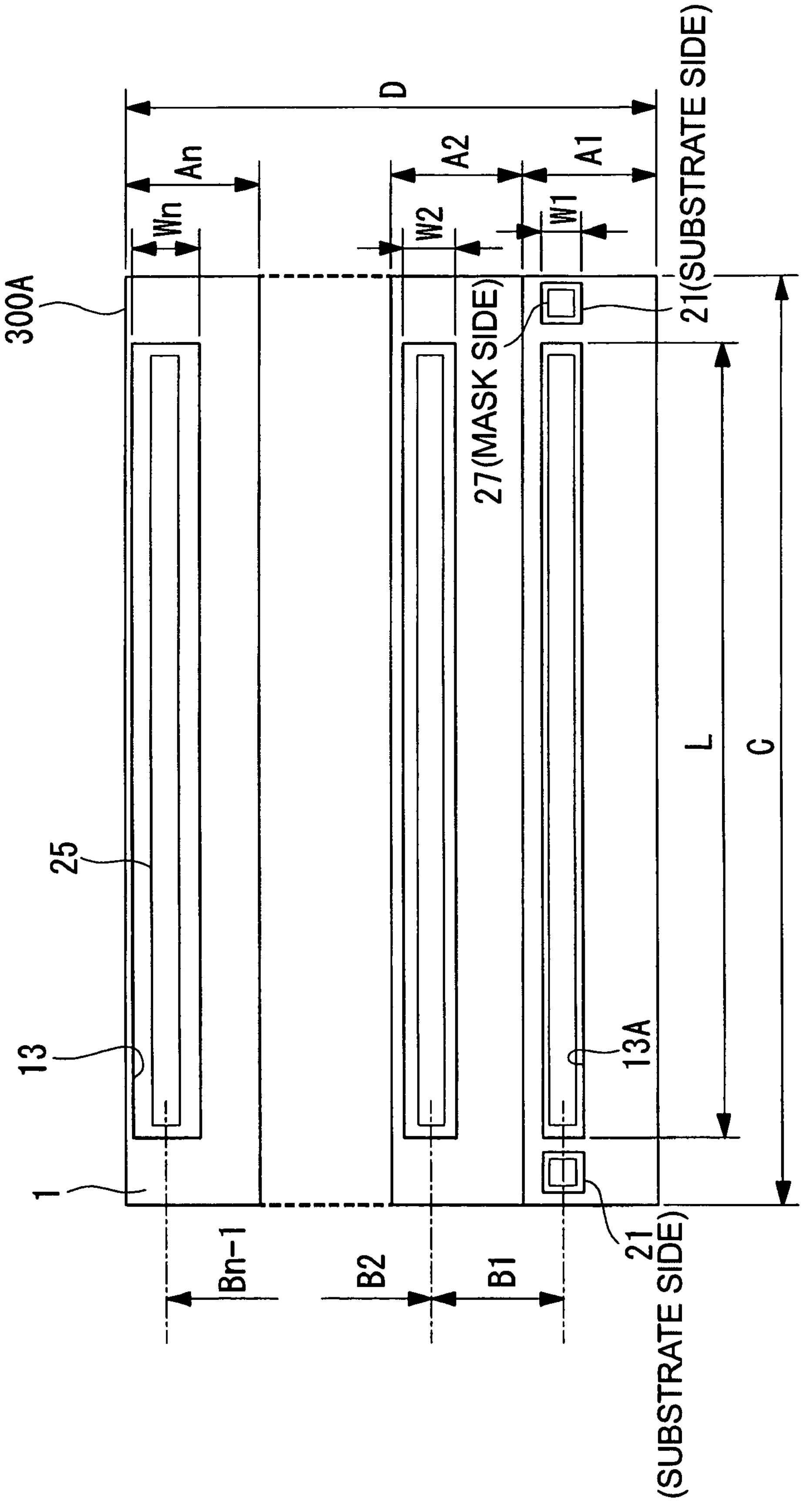
FIG. 4 is a view illustrating a state in which a collective substrate and a photo mask are aligned with each other in a heating resistor forming step of the manufacturing method for a thermal head according to the embodiment of the present invention.

The manufacturing method A according to this embodiment is, as illustrated in FIG. 4, intended to form a large number of thermal heads 1 on the large substrate 3, that is, a collective substrate (substrate) 300A. The manufacturing method A includes a concave portion forming step of forming a plurality of concave portions 13 on a surface of the collective substrate 300A having a rectangular shape, a bonding step of thermally fusion bonding the insulating film 5 on the surface of the collective substrate 300A on which the plurality of concave portions 13 are formed in the concave portion forming step, and a heating resistor forming step of forming a plurality of heating resistors 7 on the insulating film 5 so as to be opposed to the respective concave portions 13. Note that FIG. 4 illustrates a state in which a photo mask is aligned with the collective substrate 300A in the heating resistor forming step.

First, the collective substrate 300A is distributed at the same intervals in its longitudinal direction, and a region is divided for each of the plurality of thermal heads 1. The region of each thermal head 1 is a rectangular region which has sides in a width direction of the collective substrate 300A, which are represented by a long side C, and the collective substrate 300A is distributed so that short sides A and the long sides C are respectively equal among all regions of the thermal heads 1.

For example, it is assumed here that a length in the longitudinal direction and a width in the width direction of the collective substrate 300A are a length D and a width C, respectively, and a length in a longitudinal direction and a width in a width direction of the region of the thermal head 1 are a length C and a width A, respectively. Then, when a substrate which has a size of 100 mm×60 mm as a size of (the length D)×(the width C) is used as the collective substrate 300A, a size of (the width A)×(the length C) of the thermal head 1 is about 5 mm×60 mm.

Figure 5D:
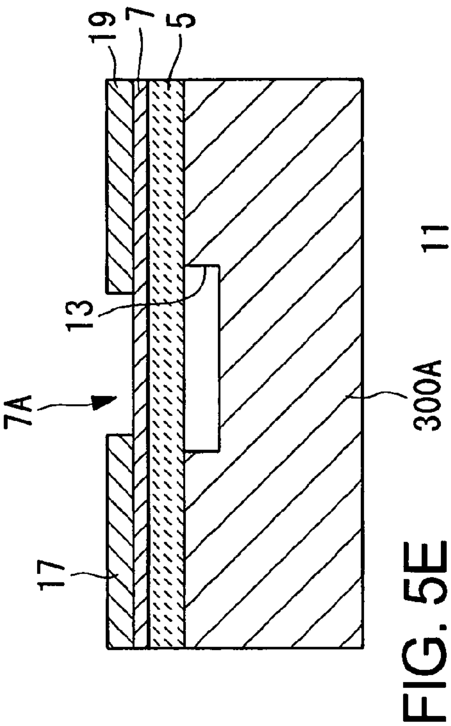
FIGS. 5A to 5E are vertical cross-sectional views illustrating a substrate in a concave portion forming step, the substrate including an insulating film in a bonding step, the substrate including a heating resistor in the heating resistor forming step, the substrate including an electrode portion, and the substrate including a protective film, respectively.
Figure 5E:
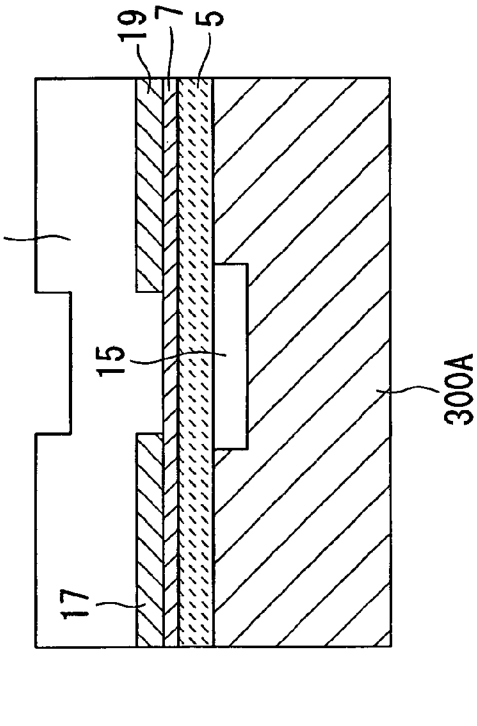
Figure 5A:
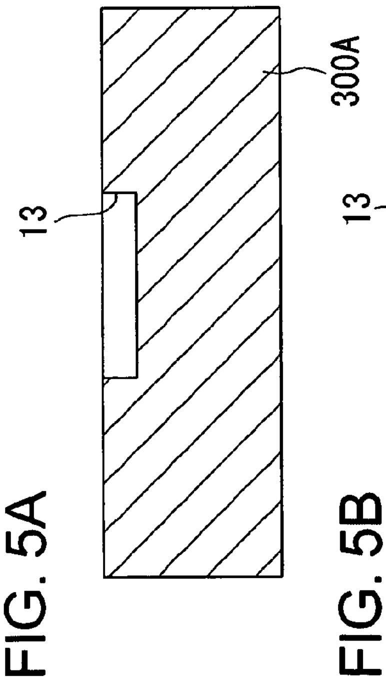

In the concave portion forming step, as illustrated in FIG. 5A, the concave portion 13 is processed in a region on an upper end surface of the collective substrate 300A, in which the heating resistor 7 is formed, and an alignment mark 21 (hereinafter, referred to as "mark", see FIG. 4) indicating one concave portion 13A (reference concave portion) used as a reference is processed as well. Note that as the alignment mark 21, for example, grooves may be formed in the vicinity of both ends of the reference concave portion 13A in its longitudinal direction.

Specifically, the concave portion 13 and the alignment mark 21 are formed by, for example, sandblasting, dry etching, wet etching, or laser processing on one surface of the collective substrate 300A.

For example, in the case of sandblasting, the surface of the collective substrate 300A is covered with a photoresist material (not shown), and the photoresist material is exposed to light using a photo mask (not shown) having a predetermined pattern, thereby solidifying a portion other than a region in which the concave portions 13 are to be formed. Then, the surface of the collective substrate 300A is washed, and the photoresist material which has not been solidified is removed, thereby obtaining an etching mask (not shown) including etching windows formed in the region in which the concave portions 13 are to be formed. The surface of the collective substrate 300A is subjected to sandblasting in this state, and thus the concave portion 13 having a predetermined depth is obtained.

Alternatively, in the case where processing is performed through etching such as dry etching or wet etching, the etching mask including the etching windows formed in the region in which the concave portions 13 are to be formed is formed on the surface of the collective substrate 300A in the same manner as that of the processing by sandblasting. The surface of the collective substrate 300A is subjected to etching in this state, whereby the concave portion 13 having the predetermined depth is obtained.

In the case of etching, for example, wet etching using an etching liquid such as a fluorine etching solution, or dry etching such as reactive ion etching (RIE) or plasma etching is employed.

Here, the collective substrate 300A and the insulating substrate 5 are bonded to each other by thermal fusion in the following bonding step, whereby the collective substrate 300A which has been exposed to high temperature undergoes heat shrinkage after the bonding. As a result, positions of the respective concave portions 13 formed on the surface of the collective substrate 300A vary between before and after the bonding. For example, as the concave portion 13 is located further apart from the reference concave portion 13, the position thereof is more likely to vary due to an effect of the thermal shrinkage.

For that reason, in the concave portion forming step, a size of the concave portion 13 is determined in consideration of the thermal shrinkage of the collective substrate 300A and its variations. A shrinkage percentage of the collective substrate 300A after the bonding is experimentally, for example, set as 99.8%. Further, variations in shrinkage percentage are about ±0.05%.

In this embodiment, a region of the thermal head 1 arranged at one end of the collective substrate 300A illustrated in FIG. 4 is set as a region of a reference thermal head 1A, and the concave portion 13 formed in the region of the reference thermal head 1A is set as the reference concave portion 13A. In addition, sizes of other concave portions 13 are formed so as to increase in proportion to an increase in distance from the reference concave portion 13A.

Specifically, when it is assumed that a width of the reference concave portion 13A is a width W1, and that widths of the concave portions 13 in regions of the other thermal heads 1 are widths W2, W3 . . . Wn in a direction in which the thermal head 1 is located further from the region of the reference thermal head 1A, setting is made so that a relationship of W1≤W2≤ . . . ≤Wn is satisfied among the widths of the respective concave portions 13.

For example, when the width W1 of the reference concave portion 13A is assumed to be about 160 μm, the width Wn of the concave portion 13 located in the furthest position from the reference thermal head 1A is about 300 μm. Note that the length L of each concave portion 13 is about 50 mm. Moreover, intervals B1, B2 . . . Bn−1 of center lines between the concave portions 13 in the regions of the adjacent thermal heads 1 are formed so as to be equal to each other.

The size of the width W is changed among the concave portions 13 in this manner, and hence, it is possible to eliminate position misalignment between a formation position of the heating resistor of a photo mask (see FIG. 4) which is used in the heating resistor forming step and the concave portion 13 even when the thermal shrinkage occurs in the collective substrate 300A. In particular, it is possible to deal with the cases in which the percentage of thermal shrinkage of the collective substrate 300A becomes smaller and larger than an estimated percentage of thermal shrinkage owing to irregularities in percentage of thermal shrinkage of the collective substrate 300A. Note that the sizes of other concave portions 13 may be set so as to be larger in proportion to a distance from the reference concave portion 13A.

Figure 5B:
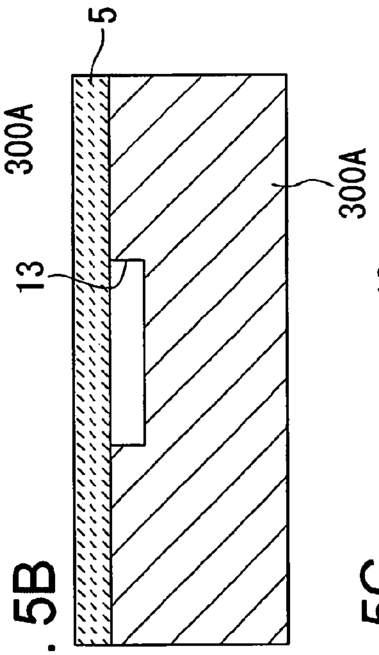

Next, in the bonding step, an etching mask is all removed from the surface of the collective substrate 300A (FIG. 5A), and then sheet glass is bonded to the surface thereof, whereby the insulating film 5 is obtained as illustrated in FIG. 5B. In the state in which the insulating film 5 is formed on the surface of the collective substrate 300A, the concave portions 13 and the grooves of the alignment mark 21 are covered with the insulating film 5, with the result that the void heat insulating layer 15 and the alignment mark 21 are formed between the substrate 300A and the insulating film 5. In this case, a depth of the concave portion 13 is equal to a thickness of the void heat insulating layer 15, which is easily controlled.

The substrate 3 and the insulating film 5 which are glass substrates are bonded to each other through thermal fusion in which an adhesion layer is not used. The bonding process is performed at temperature equal to or higher than a glass transition point and equal to or lower than a softening point of the glass substrates. For this reason, shape accuracy of the substrate 3 and the insulating film 5 can be maintained, which provides high reliability. Further, an interlayer made of metal or the like which has a larger thermal conductivity than glass is not used in a bonding portion between the substrate 3 and the insulating film 5, whereby a laminated glass substrate which has a high heat insulating effect and a simple structure can be obtained. In addition, the substrate 3 and the insulating film 5 which have the same composition are bonded to each other, whereby warp of the substrate 3 and the insulating film 5, which results from a difference in thermal expansion coefficient therebetween, can be ignored in the bonding step.

Note that, as the sheet glass used for the insulating film 5, sheet glass having a thickness of about 10 μm is difficult to be manufactured or handled and also is expensive. Therefore, in place of bonding the thin sheet glass as described above directly to the substrate 3, sheet glass having a thickness to be easily manufactured or handled may be bonded to the substrate 3, and thereafter, the sheet glass may be processed so as to have a desired thickness through etching, polishing, or the like. Accordingly, the ultra-thin insulating film 5 can be easily formed on one surface of the substrate 3 at low cost.

When the insulating film 5, that is, the sheet glass is etched, various types of etching which are employed in the concave portion forming step can be employed. Alternatively, when the sheet glass is polished, for example, chemical mechanical polishing (CMP) used in high precision polishing for a semiconductor wafer or the like can be used.

Figure 5C:
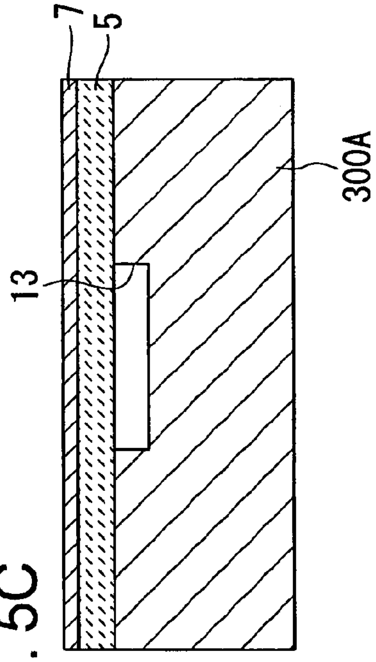

Next, as illustrated in FIGS. 5C to 5E, the heating resistor 7, the common electrode 17, the individual electrode 19, and the protective film 11 are sequentially formed on the insulating film 5. The heating resistor 7, the common electrode 17, the individual electrode 19, and the protective film 11 can be manufactured by using a conventionally-known manufacturing method for a conventional thermal head.

Specifically, in the heating resistor forming step, as illustrated in FIG. 5C, a thin film formation method such as sputtering, chemical vapor deposition (CVD), and vapor deposition is used to form a thin film made of a Ta-based or silicide-based heating resistor material on the insulating film 5. Then, the thin film made of the heating resistor material is molded using lift-off, etching, or the like, whereby the heating resistor 7 having a desired shape is formed.

Subsequently, as illustrated in FIG. 5D, on the insulating film 5, a film made of a wiring material such as Al, Al—Si, Au, Ag, Cu, and Pt is formed using sputtering, vapor deposition, or the like as in the heating resistor forming step. Then, the thus formed film is formed using lift-off or etching, or the wiring material is screen-printed and is, for example, baked thereafter, to thereby form the common electrode 17 and the individual electrode 19 which have the desired shape.

Note that the heating resistor 7, the individual electrode 19, and the common electrode 17 are formed in an appropriate order.

In patterning of the resist material for lift-off or etching in the formation of the heating resistor 7 and the electrode portion 17, 19, the photo mask is used with reference to the alignment mark 21 formed in the concave portion forming step, whereby the photoresist material is patterned.

As the photo mask, there is used a photo mask which is manufactured in consideration of the shrinkage percentage of the collective substrate 300A during the heating process in the bonding step. On the photo mask, the formation position of the heating resistor, more specifically, a heating portion region 25, and a mask-side mark 27 corresponding to the alignment mark 21 of the collective substrate 300A are formed. Note that intervals of center lines between the adjacent heating portion regions 25 of the photo mask are formed in the same size as the above-mentioned intervals of the center lines between the adjacent concave portions 13 on the collective substrate 300A, B1, B2, . . . Bn−1.

In photolithography, the alignment mark 21 and the mask-side mark 27 are aligned with each other, whereby the heating resistors 7 are formed with the reference concave portion 13A as the reference. In other words, when the photo mask and the collective substrate 300A are merely aligned with each other with reference to the reference concave portion 13A, all the heating portion regions 25 which are formed on the photo mask in advance can be limited to the range of the respective concave portions 13 of the collective substrate 300A after the thermal shrinkage. Therefore, the heating resistors 7 can be formed so that the portions serving as the heating portions 7A of the heating resistors 7 are opposed to the respective concave portions 13 of the collective substrate 300A.

For example, as illustrated in FIG. 4, when all the heating portion regions 25 which are formed on the photo mask in advance are accommodated in the respective concave portions 13, and moreover, when the heating portion regions 25 are each located in the center of the concave portion 13, it is considered that the percentage of thermal shrinkage which is estimated for the photo mask to be used in the heating resistor forming step completely coincides with the actual percentage of thermal shrinkage. In this case, the heating resistor 7 can be formed so that the heating portion 7A is located substantially directly above the void heat insulating layer 15.

In this embodiment, for example, about 400 heating resistors 7 are arranged in the thermal head 1 at intervals of about 125 μm. Note that a length Wh (see FIG. 3) of the heating portion 7A of each heating resistor 7 is about 150 μm.

After the formation of the heating resistors 7, the common electrode 17, and the individual electrodes 19, as illustrated in FIG. 5E, a film made of a material for the protective film 11, such as $SiO_2$, $Ta_2O_5$, SiAlON, $Si_3N_4$, or diamond-like carbon is formed on the insulating film 5 using sputtering, ion plating, CVD, or the like to form the protective film 11.

In this manner, the collective substrate 300A including a large number of the thermal heads 1 arranged thereon, which are as illustrated in FIG. 1, is obtained. After that, the collective substrate 300A is cut to complete the respective thermal heads 1. For example, 5 to 20 thermal heads 1 are manufactured from one collective substrate 300A.

As has been described above, according to the manufacturing method A of this embodiment, other concave portions 13 are formed so that their sizes become larger in accordance with an increase in distance from the reference concave portion 13A, and thus, the heating portion regions 25 of the photo mask can be limited to the range of the respective concave portions 13 of the collective substrate 300A even when the thermal shrinkage occurs. Accordingly, the heating resistors 7 can be formed so that the heating portions 7A are opposed to all the concave portions 13.

In addition, a bonding area between the collective substrate 300A and the insulating film 5 can be made larger compared with the case of making the sizes of all the concave portions 13 large, and the mechanical strength of the insulating film 5 can be maintained. Thus, the larger number of the thermal heads 1 which have high mechanical strength and reliability can be obtained. As a result, the yield to obtain the thermal heads 1 having high energy efficiency can be improved in the collective substrate 300A.

For example, in the case where the thermal head 1 manufactured by the manufacturing method A is employed in a thermal printer, printing can be performed on thermal recording paper with low power consumption owing to high heating efficiency of the thermal head 1. Therefore, it becomes possible to prolong battery duration.

Note that, the widths of the concave portions 13 are made so as to have a relationship of $W1 \le W2 \le \ldots \le Wn$ in this embodiment, but values of the widths W of the concave portions 13 of the adjacent thermal heads 1 may be changed geometrically. Moreover, the sizes of the widths W of the concave portions 13 may be the same with each other between the adjacent thermal heads 1, but it is required that, as the entire collective substrate 300A, the widths W of the concave portions 13 are made to satisfy the relationship of $W1 < Wn$ in the direction in which the concave portions 13 are apart from the reference concave portion 13A.

Further, this embodiment can be modified as follows.

Figure 6:
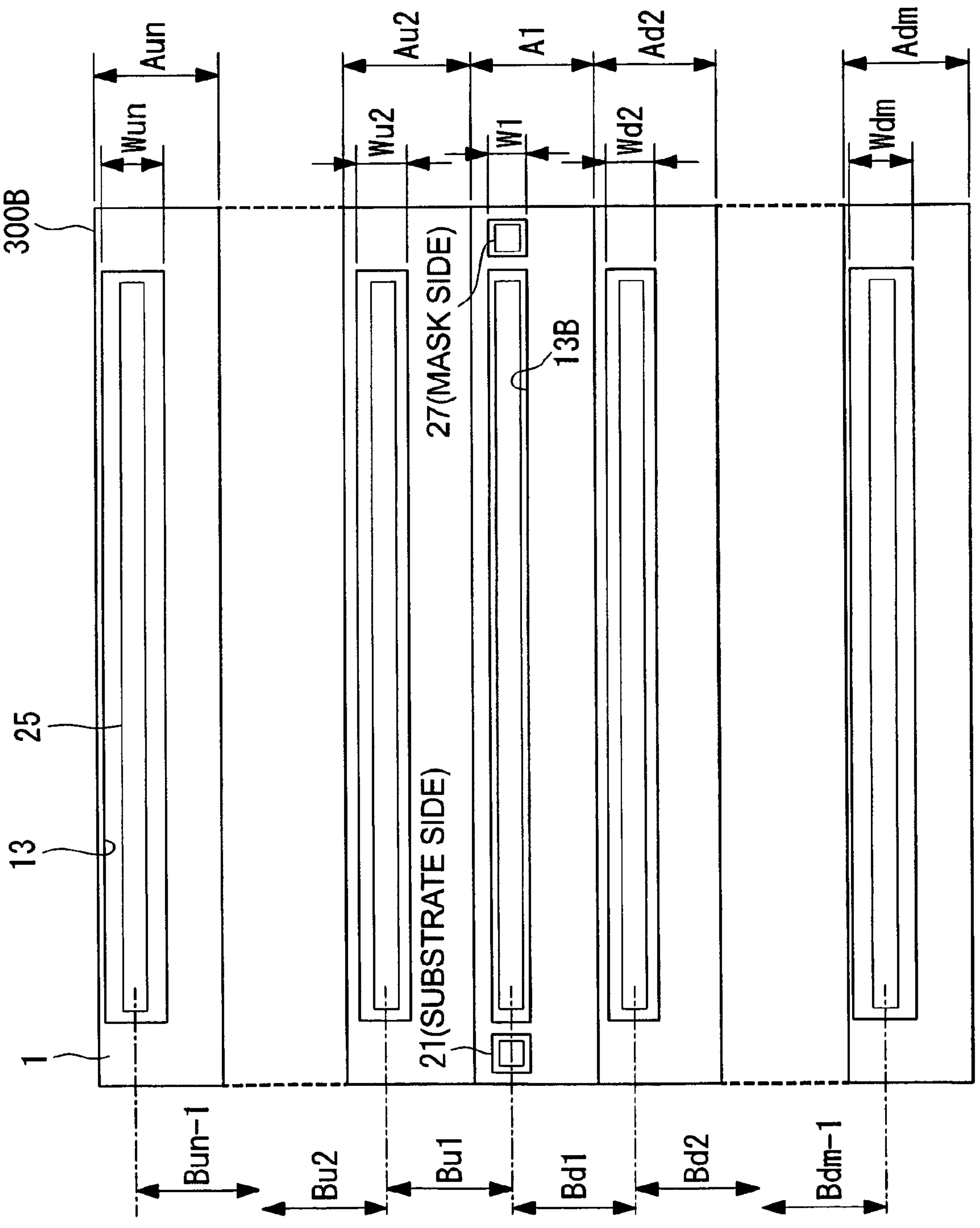
FIG. 6 is a view illustrating a state in which a collective substrate and a photo mask are aligned with each other in a heating resistor forming step according to a modification of the embodiment of the present invention.

For example, the region of the thermal heads 1 is distributed in the longitudinal direction of the collective substrate 300A in this embodiment. However, as a manufacturing method B according to a first modification of this embodiment, for example, as illustrated in FIG. 6, the concave portion 13 arranged at the center of a collective substrate 300B in its longitudinal direction may be set as a reference concave portion 13B in the collective substrate 300B in which the region of the thermal heads 1 is distributed in the longitudinal direction as in the embodiment described above. In this case, the widths W of the concave portions 13 are set to be larger as the concave portions 13 are apart from the reference concave portion 13B in a width direction thereof.

For example, in the case where a width W1 of the reference concave portion 13B is set to be about 160 μm, widths Wun and Wdm of the concave portions 13 which are arranged in positions which are most apart from the reference concave portion 13B (in other words, the concave portions 13 arranged at both ends of the collective substrate 300B in its longitudinal direction) are about 200 μm, respectively. As a result, the heating portion of the heating resistor 7 can be efficiently accommodated in the concave portion 13 after the bonding without making the concave portion 13 large unnecessarily.

Figure 7:
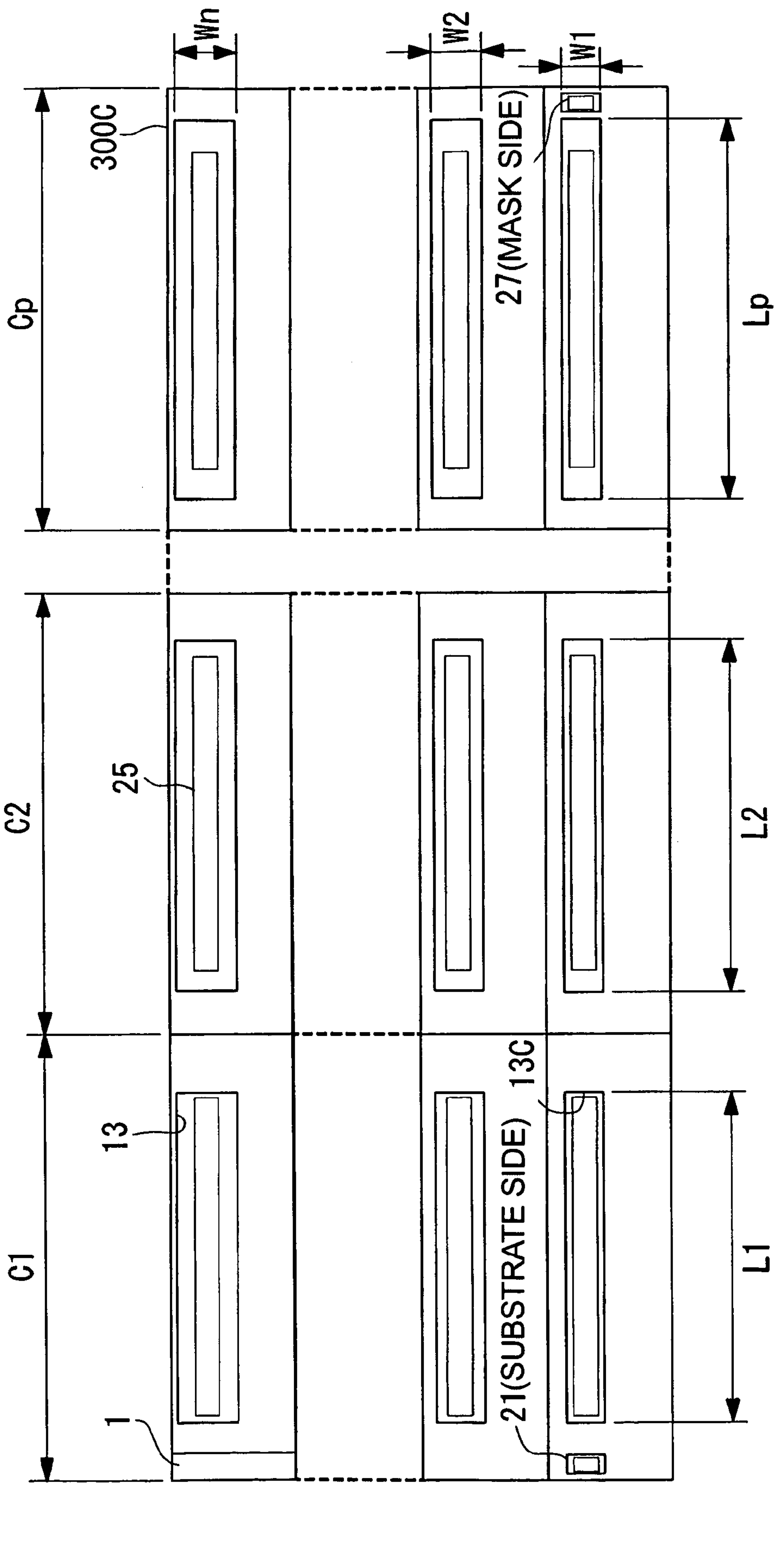
FIG. 7 is a view illustrating a state in which a collective substrate and a photo mask are aligned with each other in a heating resistor forming step according to another modification of the embodiment of the present invention.

Further, as a manufacturing method C according to a second modification of this embodiment, for example, as illustrated in FIG. 7, the region of the thermal heads 1 may be distributed in a longitudinal direction and a width direction of a collective substrate 300C. In this case, the concave portion 13 arranged at any one of four corners of the collective substrate 300C may be set as a reference concave portion 13C, and the lengths L and the widths W of the concave portions 13 are set so as to become larger as the concave portions 13 are apart from the reference concave portion 13C in the longitudinal direction and in the width direction, respectively. Accordingly, as the entire collective substrate 300C, position misalignment between the concave portion 13 and the heating portion in the longitudinal direction and the width direction can be eliminated.

Figure 8:
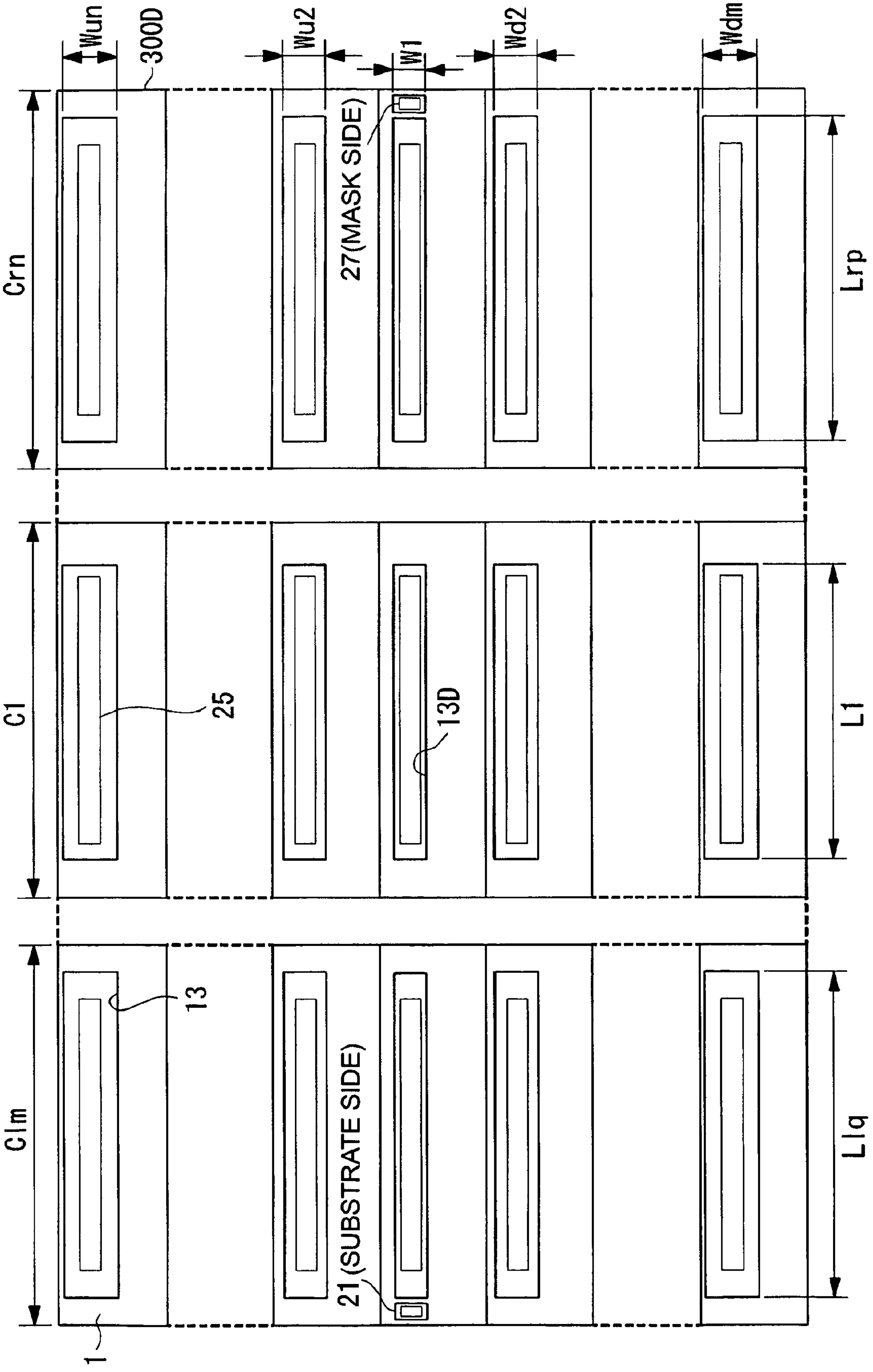
FIG. 8 is a view illustrating a state in which a collective substrate and a photo mask are aligned with each other in a heating resistor forming step according to still another modification of the embodiment of the present invention.

Still further, as a manufacturing method D according to a third modification of this embodiment, for example, as illustrated in FIG. 8, in a collective substrate 300D in which the region of the thermal heads 1 is distributed in both its longitudinal direction and width direction as in the above-mentioned second modification, the concave portion 13 arranged at the center of the collective substrate 300D may be set as a reference concave portion 13D. In this case, the lengths L of the concave portions 13 may be set so as to become larger as the concave portions 13 are apart from the reference concave portion 13D in the longitudinal direction, and the widths W thereof may be set so as to become larger as the concave portions 13 are away from the reference concave portion 13D in the width direction.

Specifically, with regard to the concave portions 13 which are apart from the reference concave portion 13D in the longitudinal direction, the lengths L may be set to have a relationship of $L1 \le \ldots \le Lrp$ and $L1 \le L2 \le \ldots \le L1q$, and with regard to the concave portions 13 which are apart from the reference concave portion 13D in the width direction, the widths W may be set to have a relationship of $W1 \le Wu2 \le \ldots \le Wun$ and $W1 \le Wd2 \le \ldots \le Wdm$. Accordingly, as the entire collective substrate 300D, position misalignment between the concave portion 13 and the heating portion can be eliminated without making the concave portion 13 large unnecessarily.

The embodiment of the present invention has been described in detail with reference to the drawings. However, a specific structure of the present invention is not limited to that of this embodiment, and design choice can also be made without departing from the gist of the present invention.

For example, as the heating resistor element component as the heating resistor 7, the present invention can be applied to a thermal inkjet head which discharges ink using heat, a valve-type inkjet head, or the like. In addition, the similar effects can be obtained also in the case of electronic components including other film-like heating resistor element component, for example, a thermal erasure head which substantially has the same structure as the structure of the thermal head 1, a fixing heater such as a printer which requires thermal fixing, or a thin-film heating resistor element for an optical waveguide optical component.

In addition, regarding the printer, the present invention can be applied to a thermal transfer printer using sublimation-type or fusing-type transfer ribbon, a rewritable thermal printer capable of coloring and erasing of a printing medium, a thermal active adhesive-type label printer which exhibits adhesion through heating, or the like.

What is claimed is:

1. A manufacturing method for a thermal head, comprising:

a concave portion forming step of forming on a surface of a substrate a plurality of concave portions including a reference concave portion so that a length of each of the plurality of concave portions other than the reference concave portion increases as a distance from the reference concave portion in a length direction increases and so that a width of each of the plurality of concave portions other than the reference concave portion increases as a distance from the reference concave portion in a width direction increases;

a mark forming step of forming on the surface of the substrate a mark identifying the reference concave portion;

a bonding step of thermally fusion bonding an insulating film to the surface of the substrate including the plurality of concave portions formed thereon in the concave portion forming step; and a heating resistor forming step of forming a plurality of heating resistors on the insulating film using a photo mask by aligning the photo mask with the substrate in accordance with the reference concave portion to form the heating resistors so as to be opposed to the plurality of concave portions.

2. A method according to claim 1; further comprising an electrode forming step of forming a pair of electrodes on the insulating film so as to be connected to respective ends of each of the plurality of heating resistors.

3. A method according to claim 2; wherein the electrode forming step comprises forming the pair of electrodes so that a heating portion of each of the plurality of heating resistors does not overlap the pair of electrodes.

4. A method according to claim 3;

wherein in the bonding step, the insulating film covers each of the concave portions to form a corresponding hollow portion; and wherein the heating portion of each of the plurality of heating resistors is disposed above the corresponding hollow portion.

5. A method according to claim 1; wherein the insulating film bonded in the bonding step comprises a glass sheet.

6. A method according to claim 5; wherein the glass sheet has a thickness of 5 μm to 100 μm.

7. A method according to claim 1; wherein the mark forming step is performed at the time the concave portion forming step is performed.

8. A method according to claim 1;

wherein the mark formed in the mark forming step comprises grooves formed in the vicinity of opposite ends of the reference concave portion.

9. A method according to claim 1; wherein in the bonding step, the insulating film covers each of the concave portions to form a corresponding hollow portion that prevents an influx of heat from the insulating film to the substrate.

10. A method according to claim 1; wherein each of the plurality of concave portions formed in the concave portion forming step has a rectangular shape.

11. A manufacturing method for a thermal head, comprising:

a concave portion forming step of forming on a surface of a substrate a plurality of concave portions each having a rectangular shape and forming a mark identifying one of the plurality of concave portions as a reference concave portion, a length and a width of each of the plurality of concave portions other than the reference concave portion increasing as a distance from the reference concave portion in a length direction and a width direction, respectively, increases;

a bonding step of thermally fusion bonding a glass sheet having a thickness of 5 μm to 100 μm to the surface of the substrate so as to cover each of the plurality of concave portions to form a corresponding hollow portion that prevents an influx of heat from the glass sheet to the substrate; and a heating resistor forming step of forming a plurality of heating resistors on the glass sheet using a photo mask by aligning the photo mask with the substrate in accordance with the reference concave portion to form the heating resistors so as to be opposed to the plurality of concave portions.

12. A method according to claim 11; wherein in the bonding step, the glass sheet covers each of the concave portions to form a corresponding hollow portion; and wherein the heating portion of each of the plurality of heating resistors is disposed above the corresponding hollow portion.

13. A method according to claim 11; wherein the mark formed in the concave portion forming step comprises grooves formed in the vicinity of opposite ends of the reference concave portion.

* * * * *